US010979462B2

(12) United States Patent
Xu et al.

(10) Patent No.: US 10,979,462 B2
(45) Date of Patent: Apr. 13, 2021

(54) IDENTIFYING VOICE OVER LTE USERS

(71) Applicant: iBasis, Inc., Lexington, MA (US)

(72) Inventors: Richard H. Xu, Wakefield, MA (US); Hwan Jang Tang, Concord, MA (US)

(73) Assignee: iBasis, Inc., Lexington, MA (US)

( * ) Notice: Subject to any disclaimer, the term of this patent is extended or adjusted under 35 U.S.C. 154(b) by 480 days.

(21) Appl. No.: 14/598,897

(22) Filed: Jan. 16, 2015

(65) Prior Publication Data

US 2016/0212177 A1 Jul. 21, 2016

(51) Int. Cl.
*H04L 29/06* (2006.01)
*H04L 29/08* (2006.01)

(52) U.S. Cl.
CPC ...... *H04L 65/1016* (2013.01); *H04L 65/1069* (2013.01); *H04L 65/1096* (2013.01); *H04L 65/40* (2013.01); *H04L 67/306* (2013.01)

(58) Field of Classification Search
CPC ............. H04L 65/1016; H04L 65/1069; H04L 65/1096; H04L 65/40; H04L 67/306
USPC ................................................. 370/328, 351
See application file for complete search history.

(56) References Cited

U.S. PATENT DOCUMENTS

| | | | | |
|---|---|---|---|---|
| 2002/0196775 A1* | 12/2002 | Tuohino | ........... | H04L 12/66 370/352 |
| 2010/0150143 A1 | 6/2010 | Ku | | |
| 2010/0153563 A1 | 6/2010 | Ku | | |
| 2011/0016145 A1* | 1/2011 | De Lutiis | ........ | H04L 29/12066 707/769 |
| 2011/0131177 A1* | 6/2011 | Sheth | .......... | H04L 65/1016 707/609 |
| 2011/0238845 A1* | 9/2011 | Keller | ............. | H04L 65/1016 709/227 |
| 2012/0250622 A1* | 10/2012 | Gomez Diaz | ......... | H04L 45/306 370/328 |

(Continued)

FOREIGN PATENT DOCUMENTS

| | | | | |
|---|---|---|---|---|
| WO | WO 2008031927 A1 * | 3/2008 | ....... | H04L 29/12094 |
| WO | WO 2013/087114 A1 | 6/2013 | | |
| WO | WO 2013087114 A1 * | 6/2013 | ......... | H04L 65/1016 |

OTHER PUBLICATIONS

Notification of Transmittal of the International Search Report and The Written Opinion of the International Searching Authority dated Apr. 26, 2016 for International Application No. PCT/US2016/013389 entitled "Identifying Voice Over LTE Users".

(Continued)

*Primary Examiner* — Melvin C Marcelo
*Assistant Examiner* — Natali Pascual Peguero
(74) *Attorney, Agent, or Firm* — Hamilton, Brook, Smith & Reynolds, P.C.

(57) ABSTRACT

According to at least one example embodiment, a method of identifying a type of communications service of a user is disclosed. The method includes receiving from an originating user device a user identifier for a terminating user, wherein the originating user is associated with a first operator and the terminating user is associated with a second operator that is different than the first. Then a service identifier which corresponds to a type of communications service for which the terminating user is provisioned. In response, the service identifier is received. Communication is provided between the originating user device and the terminating user device based on the service identifier.

17 Claims, 10 Drawing Sheets

(56) References Cited

U.S. PATENT DOCUMENTS

| | | |
|---|---|---|
| 2013/0208729 A1 | 8/2013 | Evans et al. |
| 2013/0331095 A1 | 12/2013 | Brombal et al. |
| 2014/0269510 A1 | 9/2014 | Xu et al. |
| 2015/0148024 A1* | 5/2015 | Jiao ...................... H04W 8/205 455/418 |
| 2016/0149966 A1* | 5/2016 | Remash .............. H04L 65/1096 370/351 |

OTHER PUBLICATIONS

Dodd, A. "Role of ENUM in NGN Interconnect," ETSI 3 GPP Release 8 IMS Implementation, Deployment & Testing, Nov. 24, 2010. [online] Retrieved from the Internet: http://www.gsma.com/technicalprojects/wp-content/uploads/2012/04/roleenumngninterconnect.pdf.

GSMA Associate Official Document IR.67, DNS/ENUM Guidelines for Service Providers and GRX/IPX Providers, 7.0, pp. 1-78, May 30, 2012.

\* cited by examiner

IDENTIFYING VOICE OVER LTE USERS

BACKGROUND

Wireless communications systems employing infrastructure such as Long Term Evolution (LTE) technology, also referred to as Evolved Packet System (EPS) or 4th Generation (4G), Global System for Mobile (GSM), Wideband Code Division Multiple Access (W-CDMA), and 3rd Generation (3G) systems, typically offer voice services to users. The voice service over LTE (VoLTE) uses IMS (IP Multimedia Subsystem) architecture, which has a packet switching architecture. Voice service over 3G infrastructure mostly uses Circuit Switch (CS) architecture. A mobile network with both LTE and 3G infrastructures may use both IMS and CS architectures to offer voice services for its users.

When a user with 3G voice service calls another user either within the same network or on another network, the call often is delivered via existing CS infrastructure which may connect to many operators who can terminate the call via CS systems (e.g., Public Switched Telephone Network (PSTN) networks). When a user provisioned with VoLTE service using a VoLTE capable user device (such as a mobile phone) calls another user either within the same network or on another network, the call can be delivered either via existing CS networks or using IMS infrastructure depending on how the called user's voice service is provisioned. If both users with their respective devices are known to be provisioned for VoLTE then the IMS infrastructure may be used. Otherwise, the CS network can be used to deliver the call to another network, and the called party with VoLTE service would still receive the call, but after traversing many signaling gateways along the path. However, it is often the originating operator's preference to deliver a call using VoLTE service via IMS infrastructure when both parties to the call are provisioned as VoLTE users, including due to the benefit of better end-to-end Quality of Service (QoS). Of course, the operator may deliver the VoLTE call to a called party that is using 3G via existing CS networks (such as PSTN or Voice over IP (VoIP) carrier networks).

An example of a typical potential call scenario is when a user provisioned with VoLTE/LTE with a first Mobile Network Operator (MNO) calls a user who is associated with a second MNO. The called party, for example, could be provisioned for either 3G or VoLTE voice service. The call could potentially be routed from the IMS core to the CS core at the originating MNO and then existing CS networks could be used to reach the called party in the destination MNO. Preferably, the originating MNO could identify what type of communications service the called party is provisioned for (such as VoLTE or 3G) and use this knowledge in routing the call. If the called party were found to use VoLTE then the MNO could route the call through IMS directly via IMS-Network to Network Interface (IMS-NNI) or via an IP eXchange (IPX). Otherwise, if the called party is a 3G or other circuit switched infrastructure user then the MNO could route the call through existing PSTN or VoIP carrier networks.

There are many ways to identify the network associated with the called party (i.e. the network to which the called party belongs), including ways developed to address Number Portability (NP) issues. For example, the Groupe Speciale Mobile Association (GSMA) provided PRD IR.67 which defines an architecture using ENUM (E.164 Number Mapping) hierarchy with IPX Domain Name System (DNS) infrastructure for MNOs to resolve the NP issues related to voice and messaging services which are addressed by Mobile Station International Subscriber Directory Numbers (MSISDN). An example of a MSISDN is a telephone number. Furthermore, some countries or regions may have their own database recording the ported MSISDN information for their domestic network operators to query for correction of the NP issues. Issues arise when trying to determine if a called party is a VoLTE user, especially when the called party belongs to another network. However, no current solution exists to identify whether a called party is currently using VoLTE service.

SUMMARY

Embodiments of the present disclosure provide methods, systems, and computer readable media for identifying the type of communications service (e.g. VoLTE, 3G, GSM) that a called party is currently using. This identification allows operators who provide voice service with both IMS and CS infrastructure to choose how to route the call.

According to one embodiment, a method includes receiving a user identifier for a terminating user and requesting a service identifier corresponding to a type of communications service for which the terminating user is provisioned. For example, the service identifier can be an NP corrected MSISDN with an indication that VoLTE service is provisioned, or an MSISDN without NP correction with an indication that VoLTE service is provisioned, or an MSISDN indicating no VoLTE service is provisioned. After receiving the service identifier in response, communications can be provided for to the terminating user based on the service identifier.

According to another example embodiment, a method includes receiving from an originating user device a user identifier for a terminating user, wherein the originating user device is associated with a first operator and the terminating user is associated with a second operator that is different than the first. A service identifier corresponding to a type of communications service for which the terminating user is provisioned is requested. After receiving the service identifier in response, communication between the originating user device and the terminating user based on the service identifier may be provided.

According to yet another example embodiment, a method includes acquiring user profile data for a plurality of users wherein the user profile data includes at least a user identifier and a service identifier that indicates a type of communications service for each user. This data is stored in a user profile database. After receiving a request containing at least one of the user identifiers stored in the user profile database, a response is made with the service identifier that corresponds to each of the user identifiers contained in the request and located in the user profile database.

According to yet another example embodiment, a network system includes one or more network service elements for providing voice over long term evolution (VoLTE) services. One or more of the network service elements are configured to perform the methods described above. The service elements may include one or more of Session Border Controller (SBC), Interconnection Border Control Function (IBCF), and Proxy Call Session Control Function (P-CSCF) elements.

Further, yet another example embodiment may include a non-transitory computer-readable medium having stored thereon a sequence of instructions which, when loaded and executed by a processor, causes the processor to execute the methods described herein.

BRIEF DESCRIPTION OF THE DRAWINGS

The foregoing will be apparent from the following more particular description of example embodiments of the disclosure, as illustrated in the accompanying drawings in which like reference characters refer to the same parts throughout the different views. The drawings are not necessarily to scale, emphasis instead being placed upon illustrating embodiments of the present disclosure.

DETAILED DESCRIPTION

A description of example embodiments of the disclosure follows. The teachings of all patents, published applications and references cited herein are incorporated by reference in their entirety.

Figure 1:
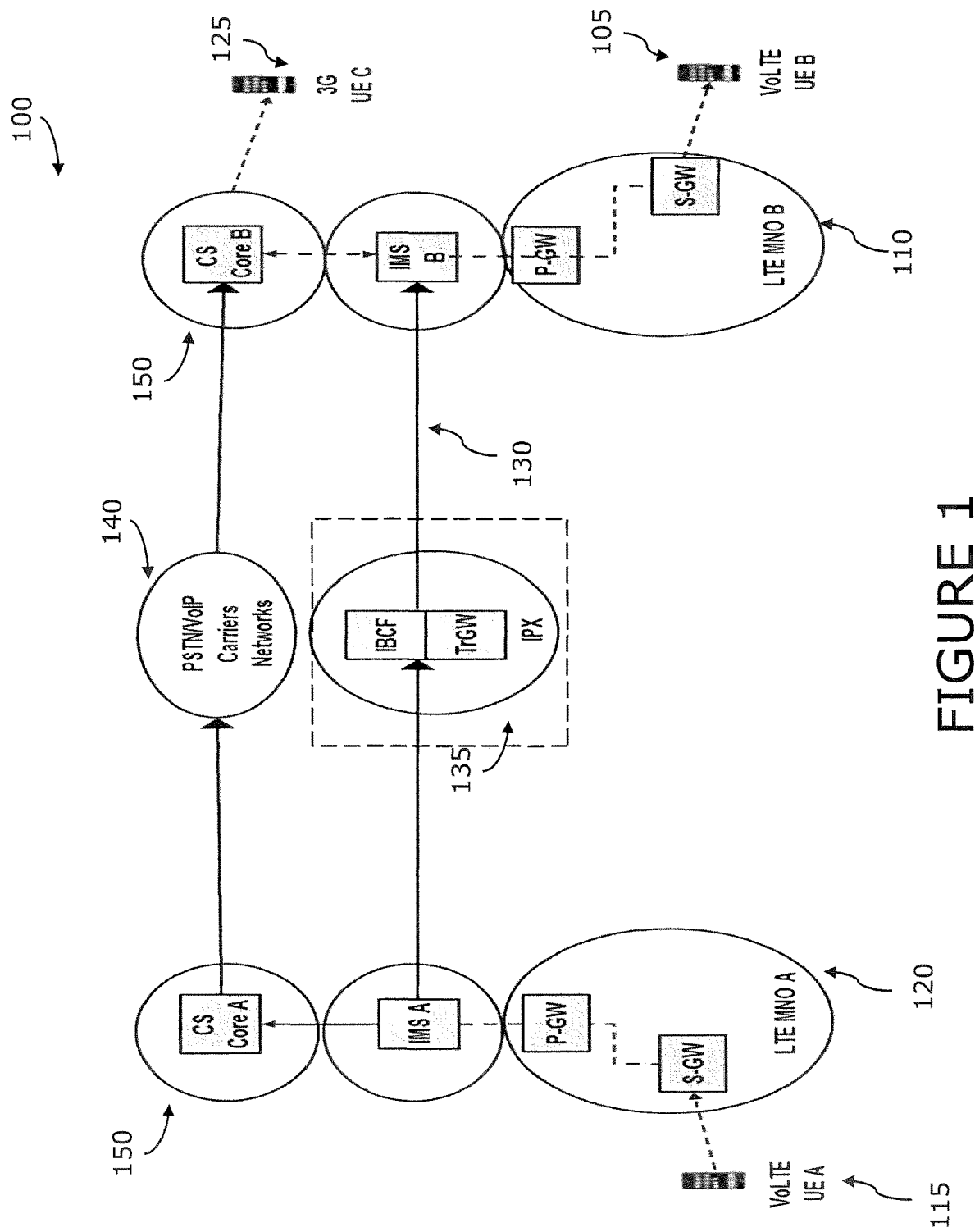
FIG. 1 is a logic network reference diagram indicating VoLTE call delivery paths between two MNOs employing LTE.

With reference to FIG. 1, a block diagram 100 illustrating exemplary call paths between two LTE operators' networks is shown. If the terminating operator 110 (the network of the called party) offers VoLTE to some of its users, including to the called user 105, the originating VoLTE operator 120 (the calling party's network) prefers to route the call via the pure IMS/VoLTE path 130 (e.g., via IPX network 135, which provides IMS proxy service in between, or direct connection 130 between the two operators) when the calling party 115 is also using VoLTE, rather than over an existing PSTN network 140. If the calling 115 or called user 125 are provisioned for 3G or other CS based communication services, the originating operator 120 may route the call via the CS core infrastructure 150 and PSTN systems 140.

Figure 2:
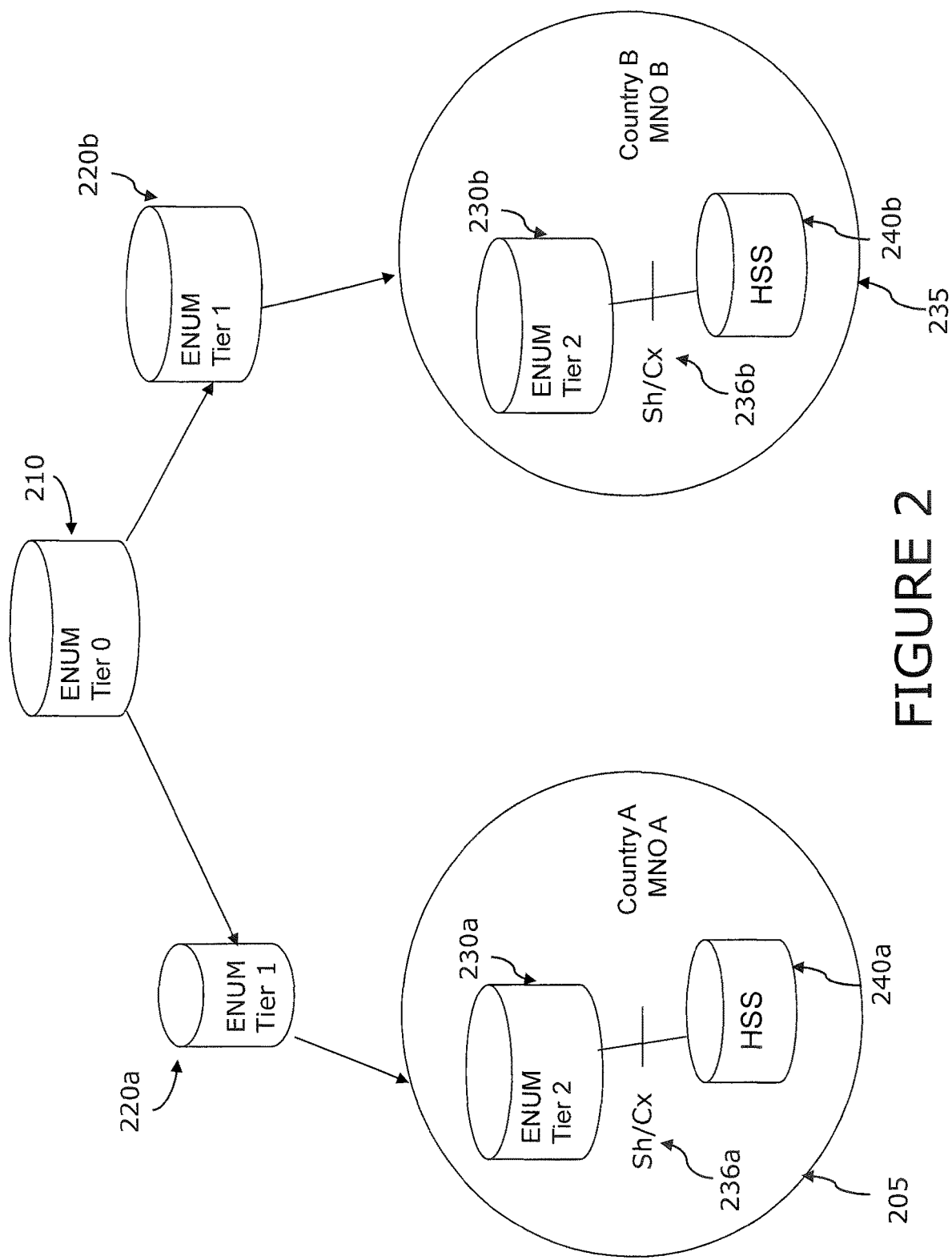
FIG. 2 is a block diagram illustrating a new interface, Sh/Cx, added at the existing GSMA ENUM Tier 2 server to direct query the Home Subscriber Server for resolving a user's communications service profile.

With reference to FIG. 2, in accordance with an embodiment a block diagram illustrating the existing ENUM query single root architecture hierarchy augmented with a new interface is shown. The Tier 0 database 210 is the global database that references country level Tier 1 databases 220a, 220b which reference customer level Tier 2 databases 230a, 230b that query HSSs 240a, 240b for user profile data. The new Sh/Cx interfaces 236a, 236b at the ENUM Tier 2 servers 230a, 230b can directly query the Home Subscriber Servers 240a, 240b for resolving users' communication services profile. For example, a query from a first MNO 205 is received at a ENUM Tier 2 server 230b of a second MNO 235, which also may search its own local database, and which queries via a new interface 236b the called party's HSS 240b for service identifier information. Service identifiers may be any information or data (such as a code or other value) that may be used to indicate the presence or absence of a type or service or to indicate what type of service is being used. This information may already be present in the HSS or may be added for this, or some other, purpose. This service identifier information could include the type of communications service for which the called party is currently provisioned, such as VoLTE or 3G service.

Figure 3:
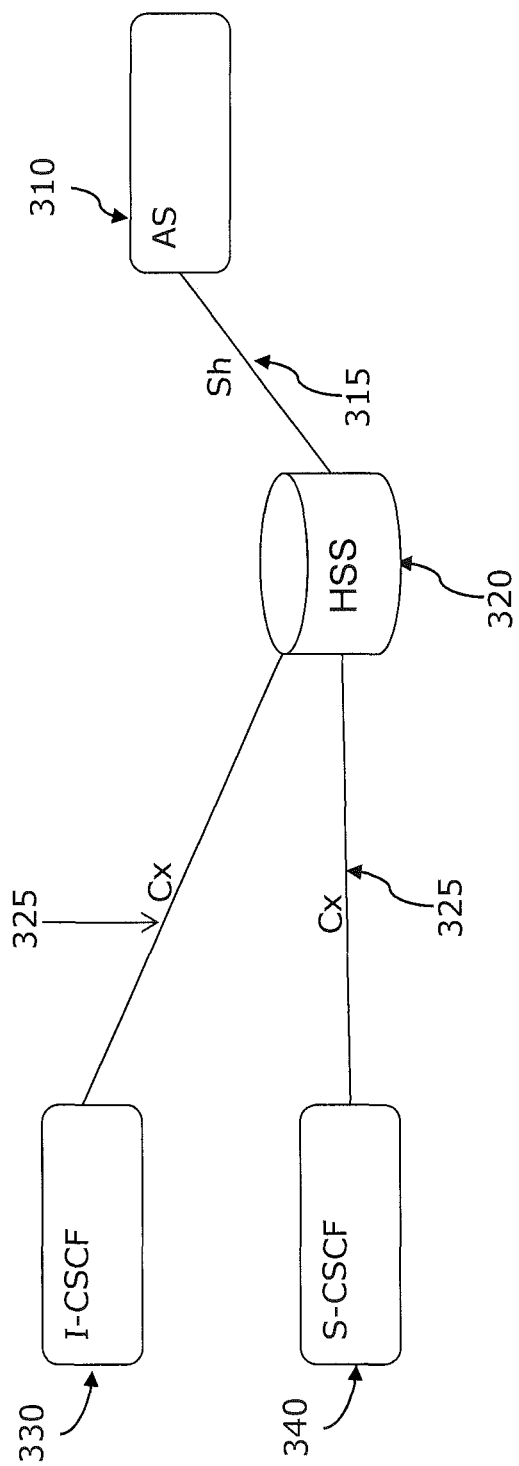
FIG. 3 is a block diagram illustrating aspects of Diameter Protocol interfaces.

The new interfaces also may be called Sh or Cx interfaces, which are defined by the Third Generation Partnership Project (3GPP) standard body as shown in FIG. 3. For an IMS system, the Sh interface 315 is between an Application Server (AS) 310 element and the HSS 320. The Cx interface 325 is between the Interrogating Call Session Control Function (I-CSCF) 330 or the Serving Call Session Control Function (S-CSCF) 340 and the HSS 315. An Sh interface 315 is used for IMS application servers (AS) 310 to query the HSS 320 for a user's IMS Service user profile data, including by using query functions or command codes under the Diameter Protocol (which is an Internet Engineering Task Force (IETF) defined protocol), such as the User Data Request (UDR) and User Data Answer (UDA) codes. For example, for a called party's MSISDN (a user IMS public ID), a code value or some other service identifier could be returned indicating whether the called party is authorized to use VoLTE service. Similarly, a Cx interface 325 may be used at the I-CSCF element 330 to query the HSS 320 for which S-CSCF element 340 should handle the MSISDN if the user is IMS/VoLTE provisioned. Therefore, the result of this query would indicate whether a MSISDN is provisioned for VoLTE service. By adding a Sh interface 315 or Cx interface 325 to ENUM Tier 2 servers, the ENUM query at the Tier 2 server can access the destination or local network's HSS 320 to identify if the targeted MSISDN is VoLTE/IMS provisioned. If the query response indicates the MSISDN is provisioned with IMS/VoLTE service, the originating network can route the call accordingly to the pure IMS path to its termination network.

Figure 4:
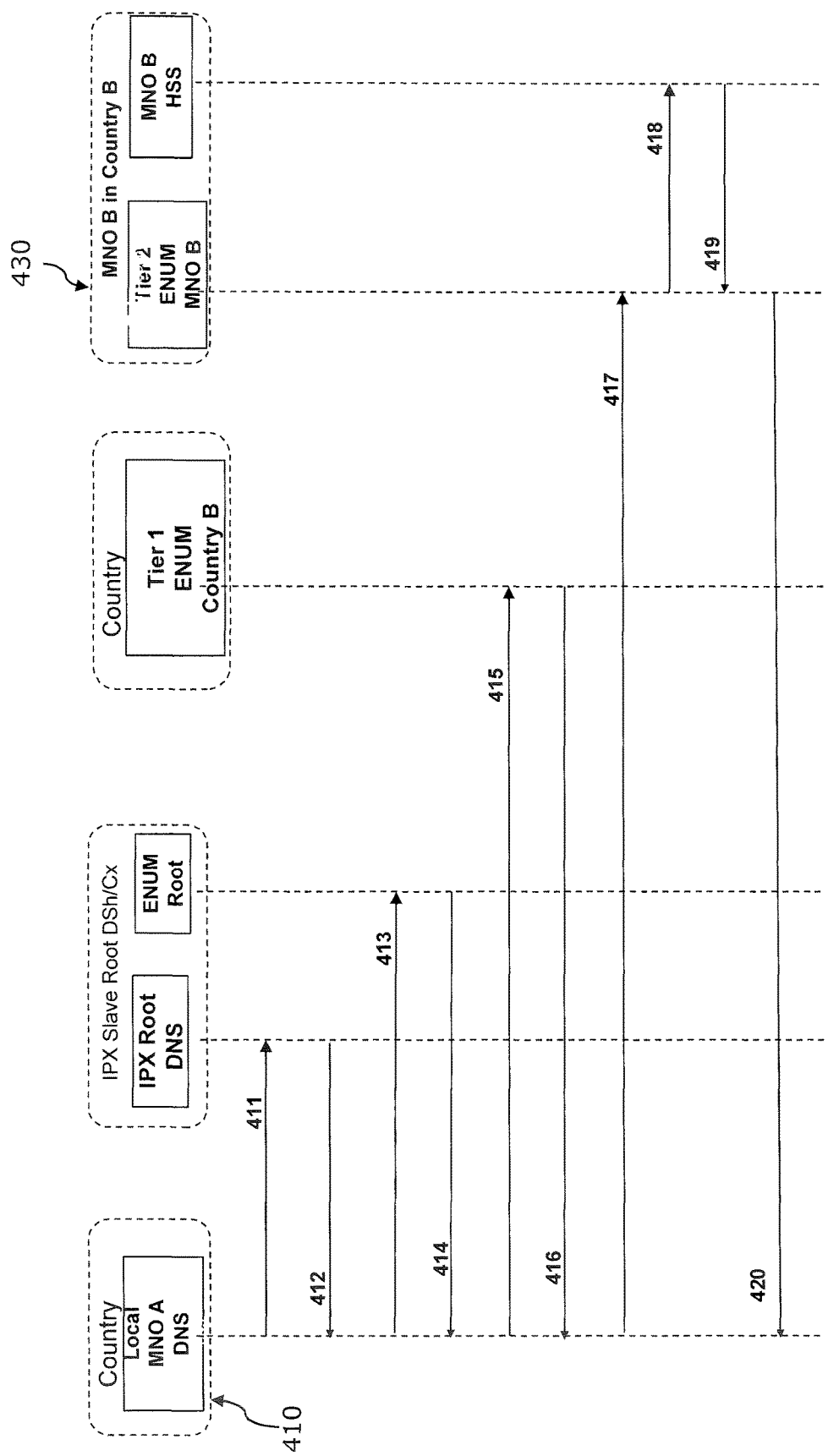
FIG. 4 is an augmented ENUM query flow in accordance with certain embodiments of the present disclosure.

With reference to FIG. 4, illustrated is the ENUM query flow 400 from an originating operator 410 to a terminating operator 430 showing the existing ENUM query 411-417, 420 augmented with the additional Sh/Cx interface queries 418, 419, in accordance with an embodiment of the present disclosure, to resolve whether the terminating user (based on its MSISDN) is provisioned for IMS/VoLTE service. The flow steps 8 and 9 represent the Sh or Cx request 418 and response 419 to interact with the ENUM Tier 2 server with needed information to identify IMS service of an MSISDN.

For the first step 411, the originating operator's Local Caching DNS Server sends the DNS query to the GRX/IPX Root DNS Server. Then 412, the GRX/IPX Root DNS Server replies with a referral to the ENUM Root Server. Third, 413 the originating operator re-sends the DNS query, but now to the ENUM Root Server. Next, the ENUM Root Server replies with a referral to the First Level ENUM Database Server 414 designated for the targeted country. Then, the originating operator re-sends the DNS query to the First Level ENUM Database Server 415. The sixth step 416 in the flow is that the first Level ENUM Database Server replies with a referral to a Second Level ENUM Database Server. Next, the originating operator re-sends the DNS query to the Second Level ENUM Database Server 417. These steps so far are part of the existing flow for the ENUM NP resolution process. However, in accordance with exemplary embodiments of the present disclosure, the Second Level ENUM Server now inquires of the HSS as to whether the called party is provisioned for VoLTE service 418. For example, the UDR code could be sent over the Sh interface or the Location-Info-Request (LIR) could be sent over the Cx interface to a local HSS to acquire IMS service identifier information of an MSISDN (which is associated with a user device such as a mobile phone). The next flow step is receiving the response to these codes with the proper information being extracted by ENUM Tier 2 server 419. The final step in the flow is returning the results of the queries, including whether the MSISDN (associated with the user's device) is provisioned for IMS service 420. The querying party, an originating operator 410, can take action accordingly based on the ENUM query result.

Figure 5:
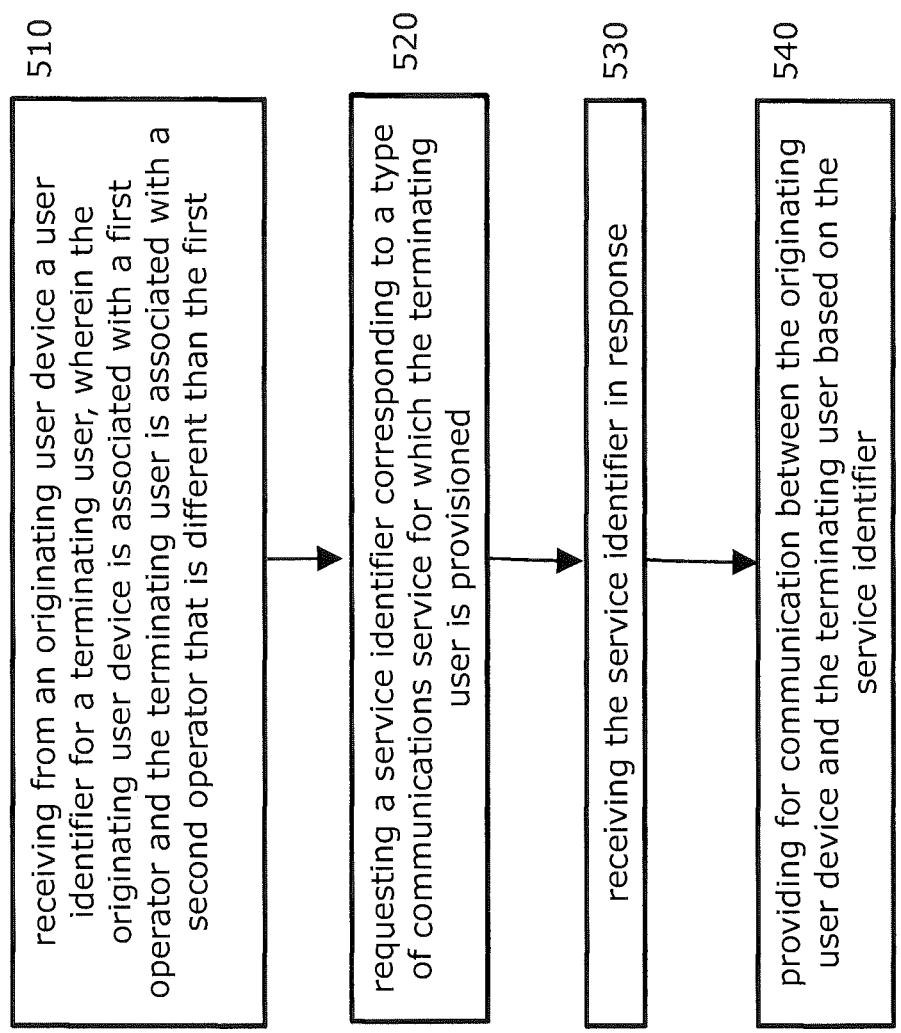
FIG. 5 is a flowchart illustrating a method of identifying a type of communications service of a user device according to at least one sample embodiment.

With reference now to FIG. 5, illustrated is a flowchart illustrating a method of identifying a type of communications service of a user device according to at least one sample embodiment. The first step 510 in the method is receiving from an originating user device (such as a mobile phone) a user identifier (such as a MSISDN) for a terminating user (who may be using a mobile phone), wherein the originating user device is associated with a first operator (e.g., a mobile network operator) and the terminating user is associated with a second operator (e.g., another mobile network operator) that is different than the first. Then, a service identifier corresponding to a type of communications service (such as VoLTE or 3G) for which the terminating user is provisioned is requested 520. Next 530, the service identifier is received in response to the request. The last step in this example method 540 is to provide for communication between the originating user device and the terminating user based on the service identifier. For example, the originating MNO can decide to route the call between the calling party and the called party using the IMS path if both parties are using VoLTE service. Yet another example, is that the originating MNO can decide to route the call between the calling party and the called party using the CS core and PSTN if the called party is provisioned for 3G service.

Figure 6:
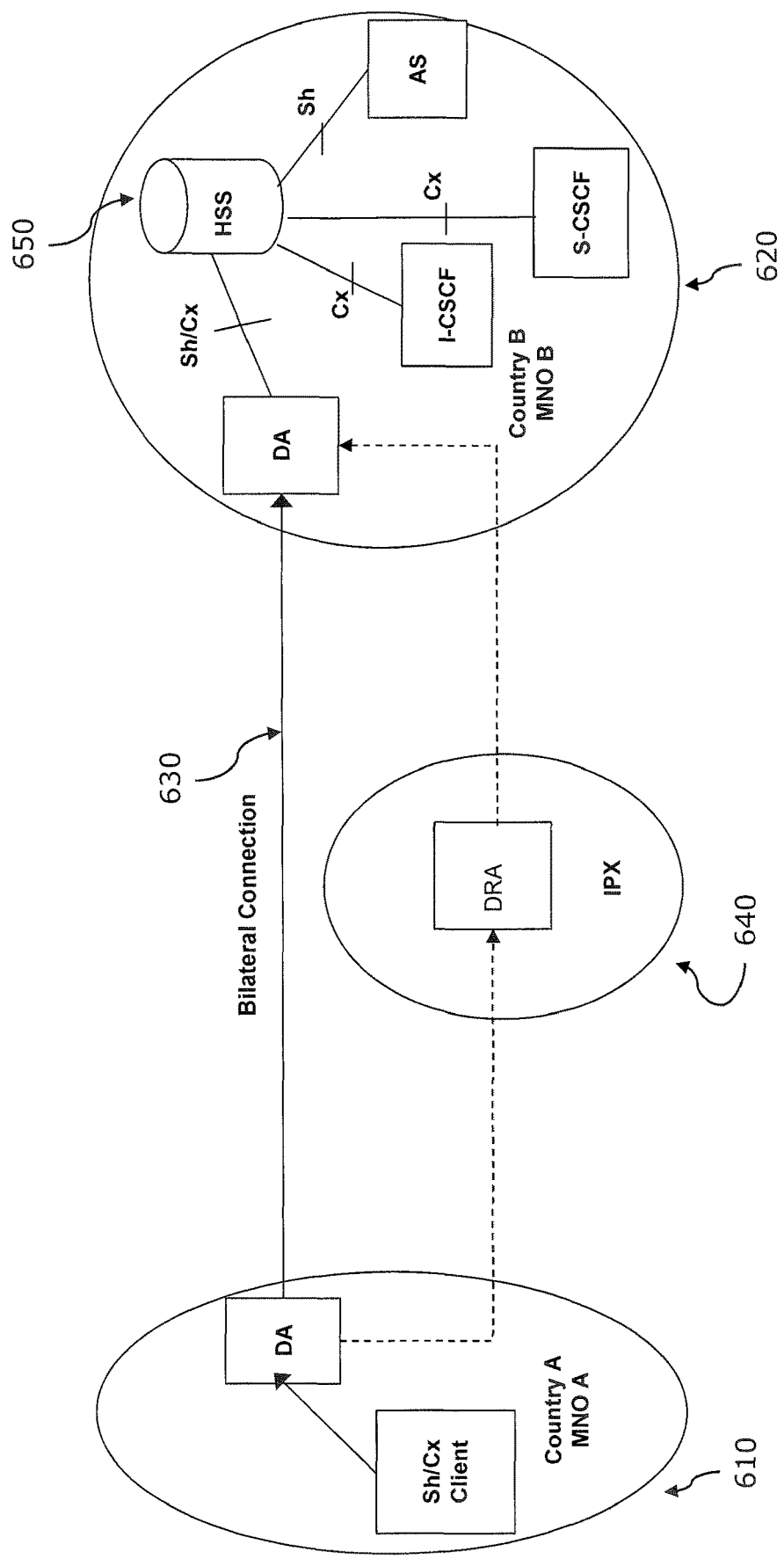
FIG. 6 is a logic network diagram illustrating an augmented Sh/Cx interface query for an example embodiment where two LTE operators are either directly connected or connected via an IPX network.

Another embodiment of the present disclosure is illustrated in FIG. 6, where a direct Sh or Cx query is established between the two involved operators 610, 620. Such direct query can be facilitated by direct connection (such as via an IP connection) 630 or by an IPX network 640 between the two operators 610, 620. By allowing a third party or external network query, an originating operator 610 can access the terminating operator's 620 HSS 650 for resolving whether the user (via its MSISDN) associated with the terminating operator 620 is IMS provisioned, and may make call routing decisions based on the query result. The query can be achieved via either direct IP connectivity 630 between the two operators 610, 620, or via an IPX network 640, including via DRA (Diameter Routing Agent) service according to GSMA PRD IR.88. As long as both involved operators 610, 620 allow such a query, the existing Diameter Signaling service infrastructure over IPX can be used and leveraged. Both operators potentially may integrate the Sh or Cx query result with their respective existing call decision process, where propriety mechanisms may be used.

Figure 7:
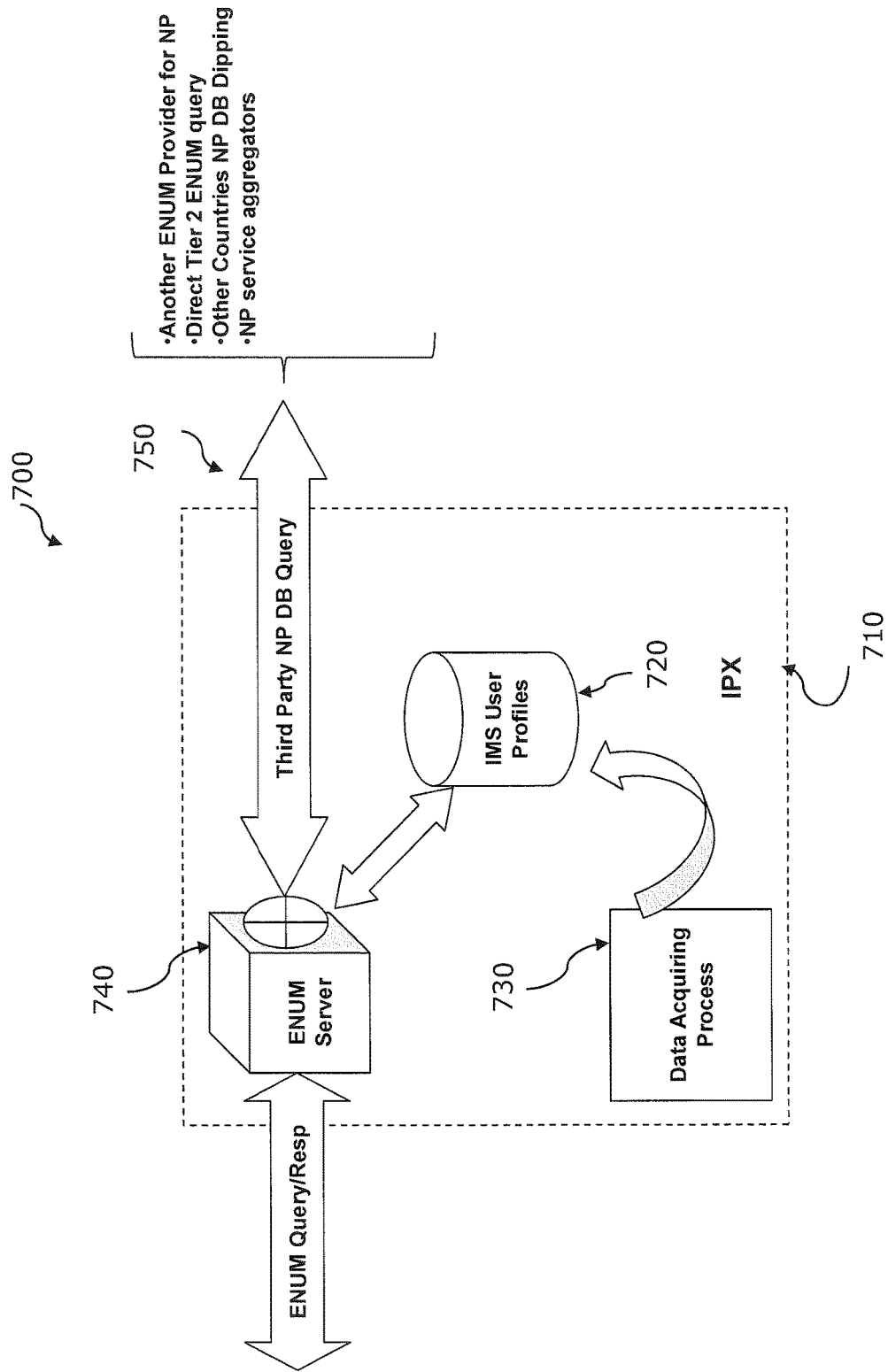
FIG. 7 illustrates a logic architecture within an IPX network to acquire IMS/VoLTE user service information via a variety of ways to provide ENUM query service with information on whether a targeted user is provisioned with VoLTE service.

Referring now to FIG. 7, illustrated is another embodiment of the present disclosure and which presents a logic architecture for resolving within an IPX service provider 710 whether a user is provisioned for IMS/VoLTE. Within an IPX network 710, a local IMS user profile database 720 can be built based on data acquisition processes 730 to extract IMS/VoLTE user information. For example, such data acquisition processes 730, can include decoding local real-time data through probes, analyzing historical data (xDR) generated by other service elements such as Session Border Controller (SBC), Interconnection Border Control Function (IBCF), and Proxy Call Session Control Function (P-CSCF), and proactive querying of different sources such as different HSS(s). Additional data acquisition processes 730 that would acquire user data as are known to one or ordinary skill in the art are within the scope of embodiments of the present disclosure. Furthermore, mobile applications, including those that can detect VoLTE User Agent used in a voice call or that can collect application information resident on a user device (such as a smartphone) may be deployed to acquire data for inclusion in the local IMS user profile database 720. With an established IMS/VoLTE user profile database 720, the IPX network 710 can provide ENUM service 740 to those originating operators who want to correctly identify a dialed party number (an MSISDN) within its own network and its service identifier (whether the MSISDN is provisioned for VoLTE service).

Furthermore, upon receiving an ENUM query for an MSISDN, the ENUM service 740 within the IPX 710 can send the query to its integrated third party Number Portability resolving services 750 (e.g., another ENUM provider for certain regions, or direct Tier 2 ENUM if accessible, or an NP database query in certain countries, and its local IMS/VoLTE user profile database). The ENUM server takes the respective response from the third party NP query and local IMS/VoLTE user profile database query, and constructs the proper response to the originating query with the network owner information and also the IMS Service indication if the MSISDN is located within its user profile database, otherwise indication of 3G voice service together with NP correction information.

Figure 8:
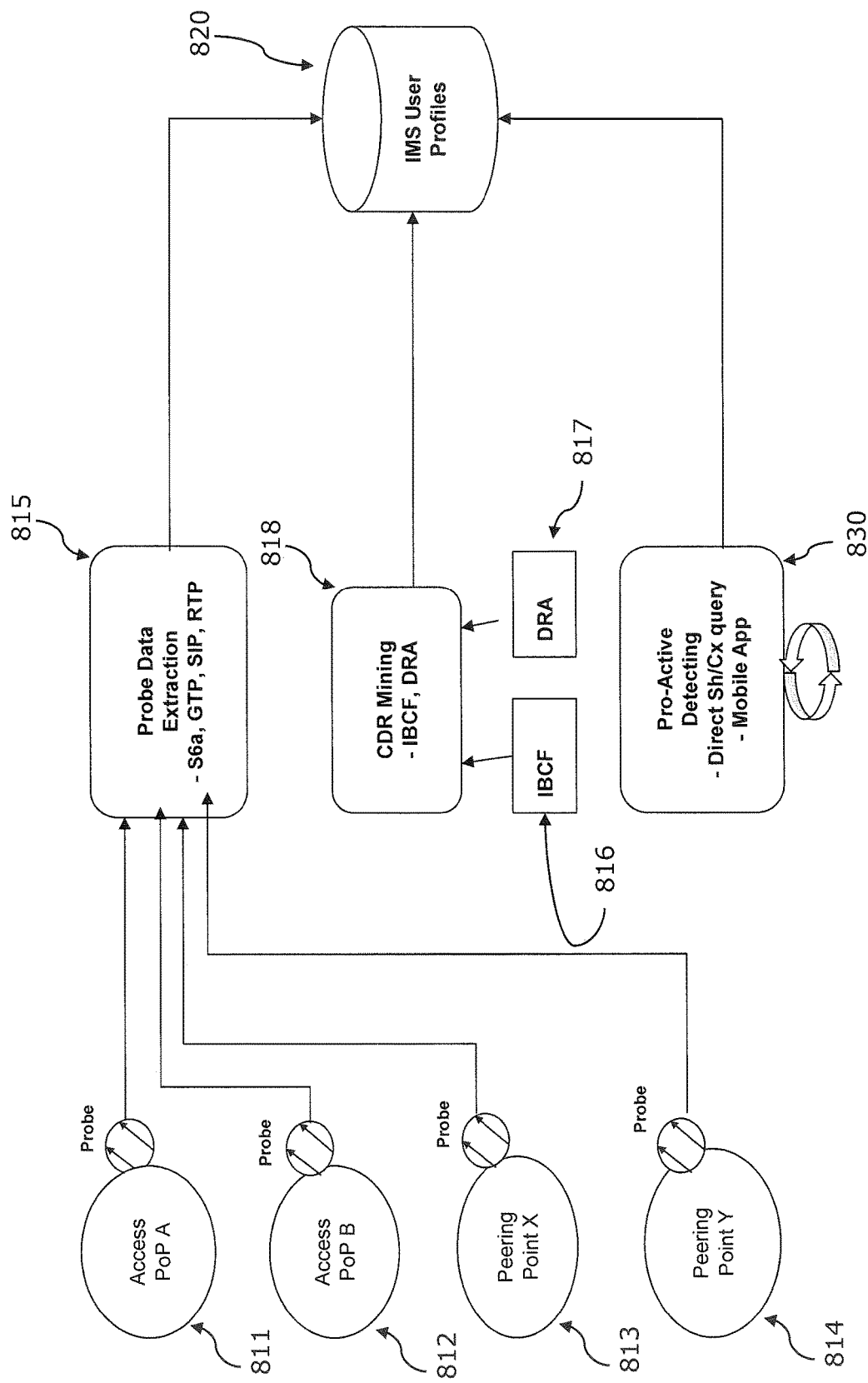
FIG. 8 is a flow diagram illustrating example data acquiring processes from an IPX network perspective in accordance with certain embodiments.

Another example embodiment of data acquisition processes in accordance with the present disclosure is illustrated in FIG. 8, where probes 811-814 may be deployed within an IPX network. For example, the probe 811-814 could be deployed at IPX peering points 813, 814, or any access link 811, 812 that is directly connected to operators' LTE Core or IMS core for either S8 home routed IMS service or Local Breakout based IMS Service via Inter-IMS Network to Network Interface (II-NNI) to an IPX. With the probes 811, 812 tapped into the direct link to those direct connected mobile operators, they can access data streams 815 such as General Packet Radio Service Tunneling Protocol (such as GTP-C and GTP-U), Diameter Protocol (e.g., S6a, S9), and Session Initiation Protocol over Inter-IMS Network to Network Interface data streams that are flowing between or among those direct connected operators' networks via the IPX. From those data streams 815 fed from the probes 811, 812, user information could be extracted according to the different protocols. For example, for the based S6a Diameter Signaling data stream 815, the probe and process could determine if an IMSI/MSISDN is provisioned with IMS service by analyzing certain Attribute Value pairs (AVP) in the request and in the response between visited LTE and home LTE networks. If an "IMS" APN is provisioned as a default APN for a user identified by its International Mobile Subscriber Identity (IMSI) and MSISDN, then the user is marked as an IMS user with corresponding owner network (the home network) information within the local IMS user profile database 820. Another example is to analyze GTP-U protocol streams 815 to see if the SIP message can be seen after the decoding of the GTP-U associated with a user identified by its IMSI or MSISDN. If such SIP messages are detected, then the user can be marked as an IMS user in the local IPX database 820. In another example, a SIP register message may be directly detected via II-NNI interface, where a user with its public ID and private ID together with its owner (home) network can be extracted, and the user is to be marked as an IMS user in the local database 820. Another example of decoding GTP-U is that when an XML Configuration Access Protocol (XCAP) payload type over HTTP protocol is observed, and the user associated with this XCAP usage may be identified as an IMS user because only an IMS user would trigger a XCAP request to its home service under the IMS server framework. Similarly, many other protocol data streams associated with IMS services can be used to extract IMS service information for the purpose of embodiments of this disclosure.

Another example embodiment illustrated in FIG. 8 is to extract users' IMS information based on historical external data representations (xDRs) 818 generated by other service elements within the IPX network, such as Session Border Controller (SBC), Interconnection Border Control Function (IBCF) 816, and Diameter Routing Agent (DRA) 817 devices or elements. Such xDRs 818 may contain the information similar to the decoding of related protocols data streams described in the earlier section. For example, when an IBCF 816 terminates a VoLTE call from one network to another network, the resulting Charging Data Record (CDR) would contain user information such as the called party's number and its call during time. Such information can be used to mark the dialed MSISDN number as an IMS user in the local IPX profile database 820 if the CDR indicates that a successful call happened. On the other hand, when an SBC receives a call from a known VoLTE network, the calling party number may be stored as an IMS user in the local IPX profile database 820. Similarly, the DRA 817 within the IPX also may generate CDRs with certain AVP information reflected in the CDR. If the CDR contains a user's "IMS" APN information, then the user can be marked as an IMS user in the local profile database 820.

Another example of an embodiment of data acquisition processes as shown in FIG. 8 is the proactive detecting process 830 in the logical architecture for resolving the IMS user within an IPX. A pro-active detecting can be achieved by direct querying HSS(s) via the Sh or Cx interface if the targeted HSS(s) allow such queries per pre-established relationships. Such query results with identified IMS users may be stored in the local IPX profile database 820 for responding to other operators' ENUM queries to the ENUM server linked to the local IPX database 820. Another example of proactive detecting 830 is collect data from mobile applications, which may collect user information, such as VoLTE user agent information resident in a smartphone. Such information also may be acquired from those mobile application service providers (e.g., Twitter, WeChat) via partnership.

Figure 9:
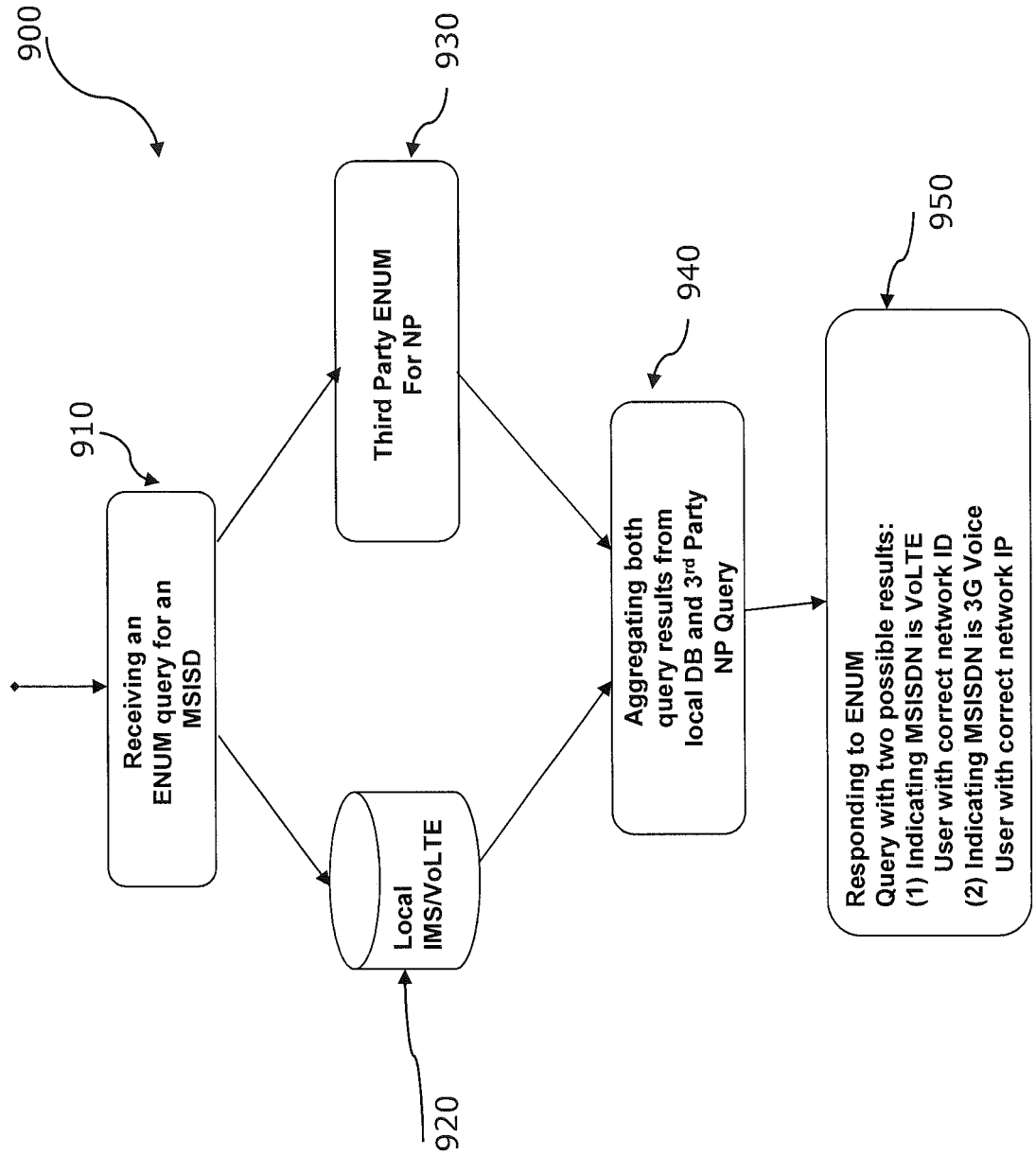
FIG. 9 illustrates a flow diagram of an ENUM and service query in accordance with certain embodiments.

FIG. 9 illustrates another embodiment of the present disclosure with a ENUM query flow 900 provided by the IPX with a local IMS User profile database and an ENUM query interface to a third party NP service. Such integrated ENUM service with the local IMS user profile database provides an originating network with both Number Portability Correction information and IMS User information so that it can make a routing decision on a VoLTE call accordingly. Upon receiving an ENUM query from an originating network 910, the ENUM server could send the query to the local IMS user profile database 920, as well as to a third party ENUM query interface for NP correction service 930. The respective responses from both the ENUM NP query 930 and the local IPX profile database 920 may be used to construct a response to the ENUM query received from an originating network 940. The response 950 could include potentially that (1) the MSISDN corresponds to a VoLTE user as well as its correct owner's network information for NP correction and (2) the MSISDN is a 3G voice user as well as its correct owner's network information for NP correction.

Figure 10:
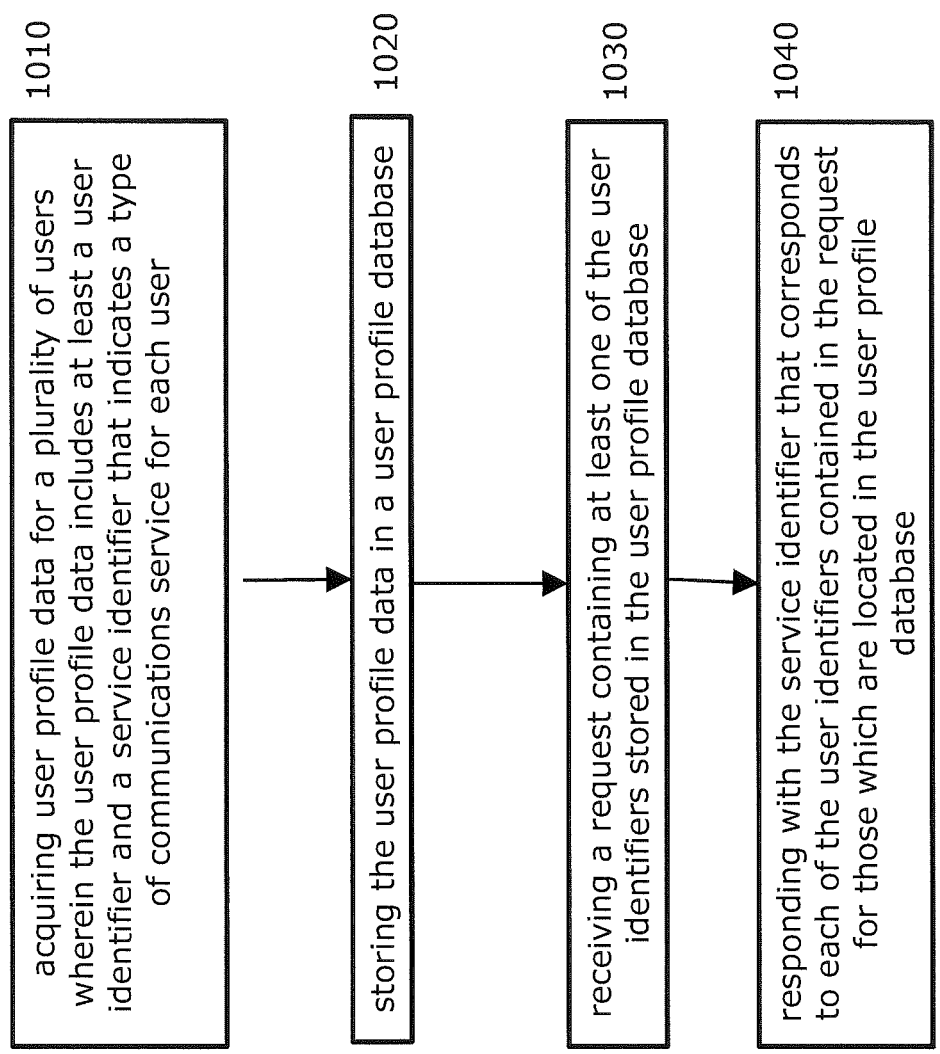
FIG. 10 is a flowchart illustrating a method of providing a database for identification of communication services according to at least one sample embodiment.

With reference now to FIG. 10, a flowchart illustrating a method of providing a database for identification of communication services according to at least one sample embodiment is shown. The first step 1010 of this example method is to acquire user profile data for a plurality of users wherein the user profile data includes at least a user identifier (such as a MSISDN) and a service identifier that indicates a type of communications service (such as VoLTE, packet switched service, 3G, or CS) for each user. Next 1020, the user profile data is stored in a user profile database. The user profile database can take many forms as is well known in the art, including a relational database, a flat file, or any other type of storage where data can be readily search and retrieved. The next step 1030 is to receive a request containing at least one of the user identifiers (such as a MSISDN) stored in the user profile database. If the received user identifier is not located in the database, then proceeding to the next step of the method need not occur. However, if desired, some form of negative acknowledgement may be sent in response. The final step 1040 of this example method is to respond with the service identifier that corresponds to each of the user identifiers contained in the request and for those that are located in the database.

It should be understood that the example embodiments described above may be implemented in many different ways. In some instances, the various methods and machines described herein may each be implemented by a physical, virtual or hybrid general purpose computer having a central processor, memory, disk or other mass storage, communication interface(s), input/output (I/O) device(s), and other peripherals. The general purpose computer is transformed into the machines that execute the methods described above, for example, by loading software instructions into a data processor, and then causing execution of the instructions to carry out the functions described, herein.

As is known in the art, such a computer may contain a system bus, where a bus is a set of hardware lines used for data transfer among the components of a computer or processing system. The bus or busses are essentially shared conduit(s) that connect different elements of the computer system, e.g., processor, disk storage, memory, input/output ports, network ports, etc., which enables the transfer of information between the elements. One or more central processor units are attached to the system bus and provide for the execution of computer instructions. Also attached to system bus are typically I/O device interfaces for connecting various input and output devices, e.g., keyboard, mouse, displays, printers, speakers, etc., to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof.

In certain embodiments, the procedures, devices, and processes described herein constitute a computer program product, including a non-transitory computer-readable medium, e.g., a removable storage medium such as one or more DVD-ROM's, CD-ROM's, diskettes, tapes, etc., that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A method of identifying a type of communications service of a user, the method comprising:
   receiving, from an originating user device at a first operator network, a user identifier for a terminating user, wherein the terminating user is at a second operator network that is different from the first operator network;
   requesting, from an Internet Protocol eXchange, a service identifier corresponding to a type of communications service for which the terminating user, at the second operator network, is provisioned, the requesting based on the user identifier received from the originating user device at the first operator network;
   receiving, from the Internet Protocol eXchange, the service identifier in response; and
   using the service identifier to allow the first operator network to choose how to route the call to provide for communication between the originating user device and the terminating user based on the service identifier corresponding to the type of communications service for which the terminating user is provisioned, wherein the Internet Protocol eXchange accesses a user profile database to respond to the request for the type of communications service for which the terminating user is provisioned.

2. The method of claim 1 wherein the types of communications service include packet switching based communications service and circuit switching based communications service.

3. The method of claim 1 wherein the types of communications service include Voice over LTE and 3G communications service.

4. The method of claim 1 wherein the originating user device is a mobile device for voice communications.

5. The method of claim 1 wherein the first operator network is a first operator mobile network and the second operator network is a second operator mobile network.

6. The method of claim 1 wherein providing for communication between the originating user device and the terminating user based on the service identifier comprises providing for Voice over LTE communications service when the service identifier indicates that the terminating user is provisioned for Voice over LTE communications service and the originating user is provisioned for Voice over LTE communications service.

7. The method of claim 1 wherein providing for communication between the originating user device and the terminating user based on the service identifier comprises providing for packet switching based communications service when the service identifier indicates that the terminating user is provisioned for packet switching based communications service and the originating user device is provisioned for packet switching based communications service.

8. The method of claim 1 wherein the user identifier is a Mobile Station International Subscriber Directory Number.

9. The method of claim 1 wherein receiving the service identifier in response comprises receiving the service identifier which corresponds to information maintained by a Home Subscriber Server associated with the terminating user.

10. The method of claim 1 wherein requesting a service identifier comprises requesting a service identifier using Diameter Protocol signaling.

11. The method of claim 1 wherein the first operator network is coupled by a direct Internet Protocol connection to a Home Subscriber Server maintained by the second operator network.

12. The method of claim 1 wherein the Internet Protocol eXchange stores to the user profile database with user identifiers and the type of communications services for which those users are each provisioned based on directly querying one or more Home Subscriber Servers associated with the user.

13. The method of claim 1 wherein the Internet Protocol eXchange stores to the user profile database with user identifiers and the type of communications services for which those users are each provisioned based on accessing one or more of General Packet Radio Service Tunneling Protocol, Diameter Protocol, and Session Initiation Protocol over Inter-IMS Network to Network Interface data streams.

14. The method of claim 1 wherein the Internet Protocol eXchange stores to the database with user identifiers and the type of communications services for which those users are each provisioned based on analyzing historical data generated by service elements.

15. The method of claim 1 wherein the Internet Protocol eXchange stores to the user profile database with user identifiers and the type of communications services for which those users are each provisioned based on interfacing with one or more mobile applications that are capable of detecting the type of communications service used.

16. The method of claim 1 wherein the Internet Protocol eXchange is coupled to a Home Subscriber Server associated with the terminating user.

17. The method of claim 1 wherein the Internet Protocol eXchange stores to the user profile database with user identifiers and the type of communications services for which those users are each provisioned based on one or more calls received from a known VoLTE network.

* * * * *